United States Patent
Okuda

(10) Patent No.: US 10,146,771 B2
(45) Date of Patent: Dec. 4, 2018

(54) MOBILE TERMINAL DEVICE IMPLEMENTING CHARACTER-PICTOGRAM TRANSLATION USING PICTOGRAM SEARCH SITE

(75) Inventor: Shinya Okuda, Kawasaki (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 554 days.

(21) Appl. No.: 13/822,964

(22) PCT Filed: Sep. 13, 2011

(86) PCT No.: PCT/JP2011/070827
§ 371 (c)(1),
(2), (4) Date: Mar. 13, 2013

(87) PCT Pub. No.: WO2012/046546
PCT Pub. Date: Apr. 12, 2012

(65) Prior Publication Data
US 2013/0197897 A1    Aug. 1, 2013

(30) Foreign Application Priority Data

Oct. 8, 2010    (JP) ................................. 2010-228351

(51) Int. Cl.
G06F 17/22    (2006.01)
G06F 17/28    (2006.01)
G06F 17/30    (2006.01)

(52) U.S. Cl.
CPC .......... *G06F 17/2863* (2013.01); *G06F 17/22* (2013.01); *G06F 17/30247* (2013.01)

(58) Field of Classification Search
USPC ....................................................... 715/271
See application file for complete search history.

(56) References Cited

U.S. PATENT DOCUMENTS

| 6,377,965 B1 * | 4/2002 | Hachamovitch ...... G06F 17/276 715/203 |
| 2004/0153963 A1 | 8/2004 | Simpson et al. |

(Continued)

FOREIGN PATENT DOCUMENTS

| CN | 1460232 A | 12/2003 |
| CN | 101694666 A | 4/2010 |

(Continued)

OTHER PUBLICATIONS

MariaDB, "https://jira.mariadb.org/browse/MDEV-28" (Year: 2012).*

(Continued)

*Primary Examiner* — Shawn S Joseph
(74) *Attorney, Agent, or Firm* — Sughrue Mion, PLLC

(57) ABSTRACT

A search execution part of a mobile terminal device searches for pictogram data from a search site on the Internet by use of an input character string serving as a keyword, thus displaying them as translation candidates in a translation candidate display area. When a thumbnail image, corresponding to pictogram data, is selected from among the displayed translation candidates, real image data of the corresponding pictogram is downloaded from the search site. A list display generation part forwards the downloaded image data to an email editing part, and then the email editing part displays the downloaded image data, which may be subjected to an editing process, at the position of character string data in a character input area (i.e. a display area during email generation).

4 Claims, 4 Drawing Sheets

(56) References Cited

U.S. PATENT DOCUMENTS

2004/0216047 A1    10/2004   Iwata
2005/0182794 A1    8/2005   Masui
2009/0141304 A1    6/2009   Suzuki

FOREIGN PATENT DOCUMENTS

| JP | 6-96056 A | 4/1994 | |
|---|---|---|---|
| JP | 2000-148748 A | 5/2000 | |
| JP | 2003-114844 A | 4/2003 | |
| JP | 2008-65674 A | 3/2008 | |
| JP | 2008-225602 A | 9/2008 | |
| JP | 2009-9214 A | 1/2009 | |
| JP | 2009-15743 A | 1/2009 | |
| JP | 2009-223782 A | 10/2009 | |
| JP | 2011-18219 A | 1/2011 | |
| WO | WO 2008111699 A1 * | 9/2008 | ......... H04L 12/5835 |

OTHER PUBLICATIONS

Communication dated Jan. 12, 2015 from the State Intellectual Property Office of People's Republic of China in counterpart application No. 201180047176.7.
International Search Report for PCT/JP2011/070827 dated Nov. 8, 2011.
Communication dated Feb. 28, 2017 from the Japanese Patent Office in counterpart application No. 2012-537625.
Communication dated Dec. 7, 2017, from the European Patent Office in counterpart European Application No. 11830479.9.

* cited by examiner

MOBILE TERMINAL DEVICE IMPLEMENTING CHARACTER-PICTOGRAM TRANSLATION USING PICTOGRAM SEARCH SITE

CROSS REFERENCE TO RELATED APPLICATIONS

This application is a National Stage of International Application No. PCT/JP2011/070827, filed on Sep. 13, 2011, which claims priority from Japanese Patent Application No. 2010-228351, filed on Oct. 8, 2010, the contents of all of which are incorporated herein by reference in their entirety.

TECHNICAL FIELD

The present invention relates to a character translation system having a pictogram data searching function, a character translation method having a pictogram data searching function, and a computer program.

BACKGROUND ART

Recently, pictograms have been used in receiving and transmitting emails with mobile terminal devices. Pictograms are pictures representing semantics, which are convenient tools for simply expressing senders' feelings.

It may be difficult to read emails received on mobile terminal devices having a small display. To facilitate readability in reading emails displayed in a limited space, pictograms have been used in emails via mobile terminal devices.

Additionally, it may not be easy to input emails with mobile terminal devices having a small operation part for inputting characters. To simplify input operations, pictograms may be used in emails via mobile terminal devices. By using pictograms, it is possible to convey semantics to the other party in a convenient way while eliminating the necessity of inputting a long sentence.

Thus, mobile terminal devices are designed to insert pictograms between sentences, thus rendering sentences with enriched expression. That is, it is possible to insert pictograms into emails produced with character codes allocated to dotted pictures or images which are preinstalled in devices.

Due to the spreading of emails written in the HTML, mobile terminal devices are designed to adopt images having the same size as pictograms in addition to pictograms preinstalled in devices. Thus, users may not experience any limitation in terms of the number of pictograms and the types of pictograms.

On the other hand, users may experience increasingly complicated operation for searching preferable pictograms.

Generally speaking, mobile terminal devices are recently designed to allow users to select desired ones from among a plurality of pictograms preinstalled therein, thus inputting pictograms into emails. Upon receiving emails including pictograms, mobile terminal devices retrieve pictograms having the specified codes from character data stored therein, thus inputting and displaying them.

In the usage of pictograms described above, however, mobile terminal devices may be able to solely display pictograms preinstalled therein as translation candidates for editing characters. Due to absence of preinstalled pictograms according to users' preference, users may need to activate browsers so as to download and acquire users' preferred pictograms; hence, users may need to carry out a special operation to download pictograms.

As prior art in this field, Patent Literature 1 discloses a technology of displaying images together with kanji translation candidates without switching over kana-kanji translation and image searching, thus inserting images into word processors. Specifically, this technology provides a pictogram dictionary for registering readings and their image file names. Upon inputting a character string via an input tool, a plurality of kanji translation candidates is listed by use of a kana-kanji translation tool and a kanji dictionary. A pictogram search tool retrieves all the kanji translation candidates and their readings from a kana-kanji translation tool so as to search through a pictogram dictionary with keys defined as readings. Upon retrieving an image file specified by the foregoing reading, a candidate list display tool displays a kanji translation candidate and its image. Characters selected from among kanji translation candidates and images are displayed with a character/image display tool.

Patent Literature 2 discloses a technology of downloading user's selected pictograms on web pages, thus facilitating availability of pictograms other than preinstalled ones. Specifically, pictogram files stored in servers are released online via web pages for the purpose of downloading them. Mobile terminal devices access servers to download pictogram files thereto and then store the received pictogram files for use in emails. Upon receiving emails including codes of pictograms which are not preinstalled, mobile terminal devices display predetermined icons at the positions of codes. Upon users' selecting icons, mobile terminal devices access servers to download pictogram files. Upon receiving pictogram files, mobile terminal devices store them in memory for use in emails while utilizing them in the currently displayed emails.

Patent Literature 3 discloses a pictogram search device which is designed to improve a pictogram translation efficiency and facilitate a function of precisely searching pictograms supplementarily expressing the content of an input sentence by way of the determination of pictogram candidates based on the full length of a character string prior to a cursor in addition to a character preceding a cursor indicating the input position of a character string. Specifically, a terminal applies an input character string and the position of a cursor indicating the input position of a current character string to a pictogram search part. The pictogram search part extracts a retrieval key from a character string prior to the position of a cursor so as to search through a pictogram database based on the extracted retrieval key. Thus, it is possible to output a pictogram, corresponding to the input character string, as a pictogram candidate on a pictogram candidate selecting screen.

Patent Literature 4 discloses a pictogram providing system which facilitates availability of pictograms, with enriched expression, in HTML mails. Specifically, this system is designed to download two pictograms, which forms a single image in its entirety, from a server to a mobile terminal device. Herein, this system downloads pictograms in a reverse order in order to prevent two pictograms, defining an input candidate, from being displayed in a left-right reversed manner in producing an HTML mail.

CITATION LIST

Patent Literature

Patent Literature 1: Japanese Patent Application Publication No. 2000-148748

Patent Literature 2: Japanese Patent Application Publication No. 2003-114844

Patent Literature 3: Japanese Patent Application Publication No. 2008-225602

Patent Literature 4: Japanese Patent Application Publication No. 2009-009214

SUMMARY OF INVENTION

Technical Problem

However, the above function is applicable to solely the preinstalled pictograms and the pictograms, which are downloaded from browsers by users, i.e. solely the pictograms stored in mobile terminal devices which are targets for the retrieval of input character strings. This may cause a problem in limiting the types of pictograms for retrieval.

For this reason, when mobile terminal devices do not store pictograms suitable to images, it is necessary to terminal character editing, or it is necessary to download pictogram data via an operation of activating browsers according to multitask functions. Since this operation spends time and effort, users may need to select pictograms, by compromise, which may be the closest to users' desired pictograms, from among pictograms preinstalled in mobile terminal devices, or users may give up inputting pictograms.

That is, mobile terminal devices preinstall pictograms in a limited manner; hence, users may give up using pictograms while users may be forced to describe normal characters when rendering the content which cannot be expressed using the preinstalled pictograms. In this aspect, emails transmitted with mobile terminal devices may not fully satisfy users' demands in terms of the expression of users' feelings, the input operability, and the readability for receivers.

FIG. 4 is an explanatory illustration for an operation screen using a generally-known character translation system having a pictogram data searching function.

Hereinafter, an operation method for a generally-known character translation system (herein, referred to as a mobile terminal device A) having a pictogram data searching system with reference to FIG. 4.

First, an appropriate character string is input into a character input area C by use of an input tool (e.g. a keyboard) installed in the mobile terminal device A.

Thus, pictogram data translation candidates SP, preinstalled in the system, are displayed together with normal translation candidates SC such as kanji and katakana in a translation candidate display area D.

In the generally-known conventional system, as described above, translation candidates displayed in the translation candidate display area D should be limited to pictogram data preinstalled in the system.

In this connection, the foregoing Patent Literature 2 teaches a technology of expanding pictogram translation candidates, which however cannot allow users to designate search sites while specifying the number of searched pictograms and which cannot share a predictive translation function.

The present invention is made in consideration of the above problem and is designed to provide a character translation system having a pictogram data searching function, which is able to search and display pictogram data, corresponding to input character strings, from search sites on the Internet by use of search words representing character strings which are inputted via a character input and character translation operation in email editing or memo inputting, as well as a character translation method having a pictogram data searching function and a computer program.

Solution to Problem

To solve the above problem, the present invention is directed to a character translation system having a pictogram data searching function which includes an email editing part which displays an input character string in a character input display area on a display screen; a memory which stores pictogram data in correspondence with the character string; a search execution part which obtains pictogram data, specified by the character string, from the memory or an external search server device connected via a communication network; a list display generation part which displays pictogram images of the obtained pictogram data as translation candidates in a list form in a translation candidate display area on the display screen; and a display which displays the pictogram image, which is selected from among the translation candidates and which substitutes for the character string displayed in the character input area.

The present invention is directed to a character translation method with a pictogram data searching function which includes a step of inputting a character string; a step of displaying the character string in a character input display area; a step of obtaining pictogram data, corresponding to the character string, among a plurality of pictogram data stored in a memory; a step of obtaining pictogram data, corresponding to the character string, from an external search server device connected via a communication network; a step of displaying pictogram images of the obtained pictogram data as translation candidates in a list form in a translation candidate display area; a step of selecting a pictogram image as a translation candidate; and a step of displaying the selected pictogram image, which substitutes for the character string displayed in the character input area.

The present invention is directed to a computer program, which is a computer program executing and controlling a character translation process with a pictogram data searching function, and which includes a step of inputting a character string; a step of displaying the character string in a character input display area; a step of obtaining pictogram data, corresponding to the character string, among a plurality of pictogram data stored in a memory; a step of obtaining pictogram data, corresponding to the character string, from an external search server device connected via a communication network; a step of displaying pictogram images of the obtained pictogram data as translation candidates in a list form in a translation candidate display area; a step of selecting a pictogram image as a translation candidate; and a step of displaying the selected pictogram image, which substitutes for the character string displayed in the character input area.

Advantageous Effects of Invention

The character translation system having a pictogram data searching function according to the present invention may demonstrate an effect which allows users to use desired pictograms in the system previously storing no pictogram data downloaded thereto. In this case, users do not need to execute a download operation by themselves, while users are automatically allowed to use pictograms in a similar manner as a normal pictogram translation function; this provides an effect which does not need users to have a consciousness of download execution.

DESCRIPTION OF EMBODIMENT

Hereinafter, an embodiment of the present invention, relating to a character translation system having a pictogram data searching function, a character translation method having a pictogram data searching function, and a computer program, will be described in detail with reference to the drawings.

Figure 1:
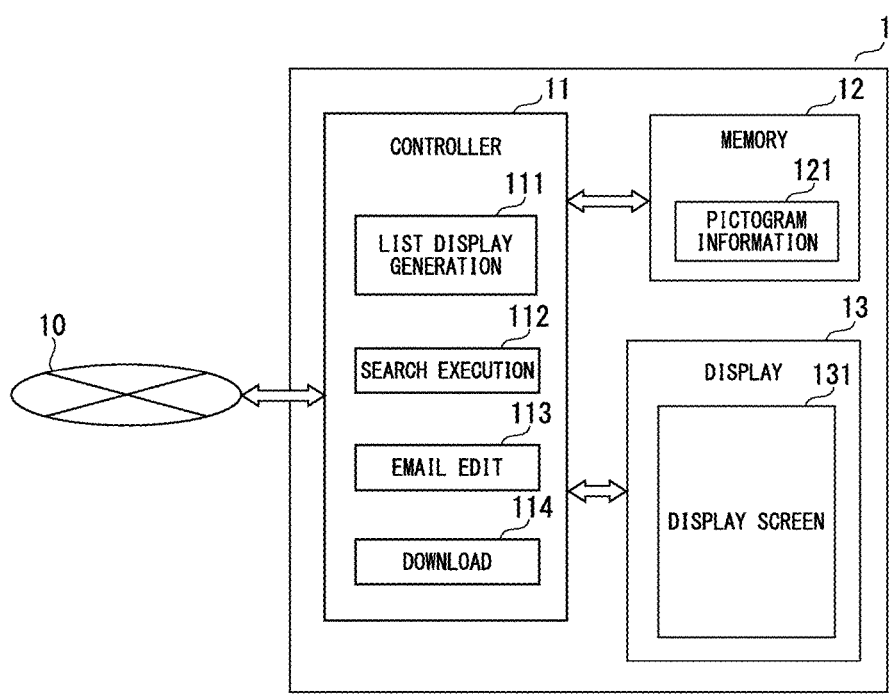
FIG. 1 A configuration diagram of a character translation system having a pictogram data searching function according to an embodiment of the present invention.

FIG. 1 is a configuration diagram showing the entire configuration of the character translation system having a pictogram data searching function according to the embodiment of the present invention.

In this figure, the character translation system having a pictogram data searching function according to the present embodiment is a mobile terminal device 1 having a browser function, which includes a controller 11, a memory 12, and a display 13. The controller 11 includes a list display generation part 111, a search execution part 112, an email editing part 113, and a download part 114.

The memory 12 stores pictogram information 121 including preinstalled pictogram data and pictogram data which are downloaded to the mobile terminal device 1 upon user's selection.

The controller 11 controls the entirety of the mobile terminal device and implements the functions of the list display generation part 111, the search execution part 112, the email editing part 113, and the download part 114.

The list display generation part 111 edits pictogram images (including thumbnail images), representing translation candidates of pictogram data, so as to display them in a list on a display screen 131 of the display 13.

The search execution part 112 acquires pictogram data (including thumbnail image data), corresponding to an input character string, from the memory 12 while searching through a preset search site B (FIG. 2) via the Internet 10.

The email editing part 113 controls the entire function of an email editing process.

The download part 114 downloads real image data (hereinafter, alternatively referred to as real data) from the search site B when pictogram data obtained from the search site B represents thumbnail image data.

The controller 11 implements an IP protocol connectible to at least the Internet 10. Any user may download desired pictogram data via the Internet 10. The mobile terminal device 1 of the present embodiment is configured to be connected to the Internet 10. Generally speaking, the present invention may employ any configuration connectible to mobile phone lines and mobile communication networks (not shown) including the Internet.

The following description refers to the case where the mobile terminal device 1 serves as an example of a character translation system having a pictogram data searching function according to the present invention. The present invention needs a character translation system having a pictogram data searching function to be equivalent to an information terminal device connectible to networks (including the Internet).

The character translation system having a pictogram data searching function according to one embodiment of the present invention is designed to automatically search pictogram data on the Internet by use of search words corresponding to an input character string while displaying the searched pictogram data as translation candidates, thus achieving user's selection. There is a possibility in that character translation may be delayed due to a long search time at inadequate communication speed. Thus, it is possible to create any configuration which allows any user to determine whether or not search is needed by way of the setting as to whether or not pictogram search should be carried out or by way of a button rendering "pictogram search" as a software key for character translation.

Additionally, search destinations for pictogram data may be fee-charging sites or public sites (i.e. external servers).

To facilitate easy search for pictograms according to user's preference, it is possible to employ any configuration which allows any user to select search destinations in advance.

Additionally, the system of the present invention may be furnished with a predictive translation function. Specifically, the predictive translation function may predict character strings, corresponding to character strings which should be translated into pictograms, based on previously input character strings.

In order to improve responsiveness, it is possible to cache a predetermined amount of pictogram data (including thumbnail image data) in the present system. In order to avoid the situation where too many pictograms are displayed as translation candidates, it is possible to limit the number of pictograms, which should be downloaded once, to a certain number beginning with the highest search count.

Figure 2:
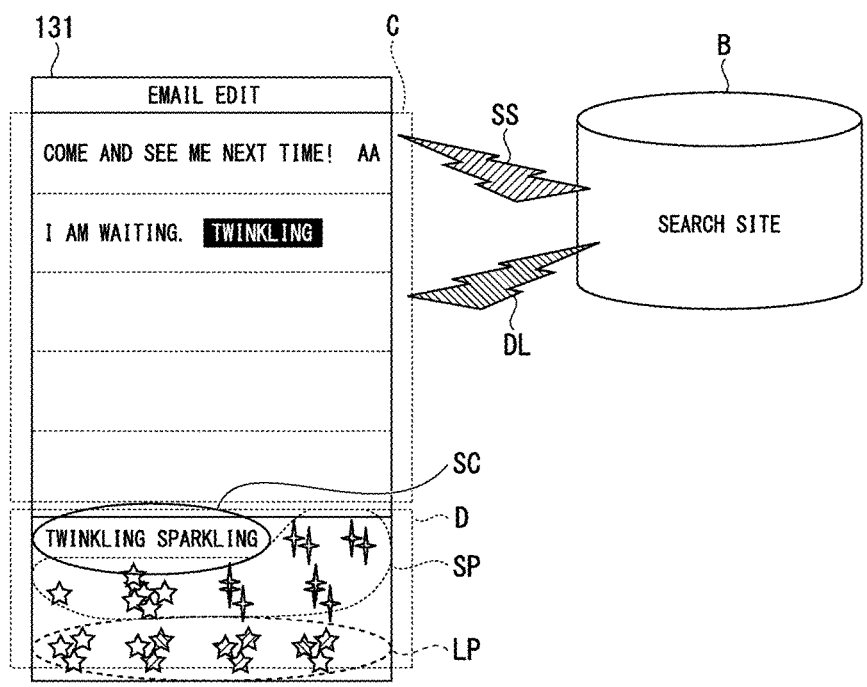
FIG. 2 An explanatory illustration for a pictogram translation processing method with the character translation system having a pictogram data searching function according to an embodiment of the present invention.

FIG. 2 is an explanatory illustration for a pictogram translation processing method applied to a character translation system having a pictogram data searching function according to the embodiment of the present invention.

In FIG. 2, the mobile terminal device 1 according to the embodiment of the present invention is connected to the search site B via the Internet. The display screen 131 of the mobile terminal device 1 includes a character input area C and a translation candidate display area D.

The following description refers to an example of a pictogram translation process which is carried out when a user inputs a character string "twinkling" in an email editing process using the email editing part 113 of the mobile terminal device 1.

First, a preparation process (preprocessing), which each user needs to perform before executing a pictogram translation process, will be described.

The mobile terminal device 1 of the present system allows each user to register a site for performing pictogram search SS in advance. Thus, each user may register any site for performing a pictogram search and any number of pictograms at higher places in searching as the user setting in the memory 12 before performing a pictogram translation process. Search sites, including user's specified sites, are set to the search execution part 112.

To prevent a high load of the mobile terminal device 1 due to plenty of characters in searching, it is necessary to limit the specific search sites and the number of pictograms in searching, wherein even if each user does not implement the above setting, the present system may install default values representing the specific search sites and the upper-limit number of pictograms in searching, thus preventing a high load of the mobile terminal device 1.

Hereinafter, a procedure of a pictogram translation process (i.e. a procedure of processing in the present system and a procedure of operation at the user's side) will be described in a schedule form.

(1) A user may use an input tool of the mobile terminal device 1 to input a character string (herein, a character string "twinkling") in the character input area C (i.e. a character input display area) on the display screen 131. Herein, the email editing part 113 performs email editing in the character input area C.

(2) Using an input character string "twinkling" as a keyword, the search execution part 112 of the mobile terminal device 1 performs a search SS on pictogram data with the search site B via the Internet, thus automatically downloading and obtaining a predetermined number of thumbnail image data of pictogram data counted from the highest place in searching (wherein it does not directly obtain pictogram data but thumbnail image data, corresponding to pictogram data, in consideration of responsiveness, however, it is possible to obtain real data of pictograms).

(3) The list display generation part 111 of the mobile terminal device 1 displays thumbnail images LP, corresponding to thumbnail image data of pictogram data obtained in (2), in addition to normal translation candidates SC, such as kanji and katakana (e.g. "twinkling" and "sparkling"), and pictogram images SP of pictogram data, stored in the memory 12 of the mobile terminal device 1, in the translation candidate display area D (4) When a user selects thumbnail images LP, corresponding to pictogram data obtained in (2), among translation candidates displayed in the translation candidate display area D, the download part 114 performs downloading DL on the corresponding real image data of pictograms from the search site B. Upon reception, the list display generation part 111 forwards the downloaded real image data to the email editing part 113. The email editing part 113 replaces a character string "twinkling", in the character input area C (i.e. a display area currently used for generating an email) of the display screen 131, with real image data, thus displaying it. At this time, the email editing part 113 may directly replace a character string "twinkling" with real image data; alternatively, it is possible to replace them after executing an editing process (which may include code conversion). Thereafter, the email editing part 113 performs a process of stuffing a vacant area or the like.

Figure 3:
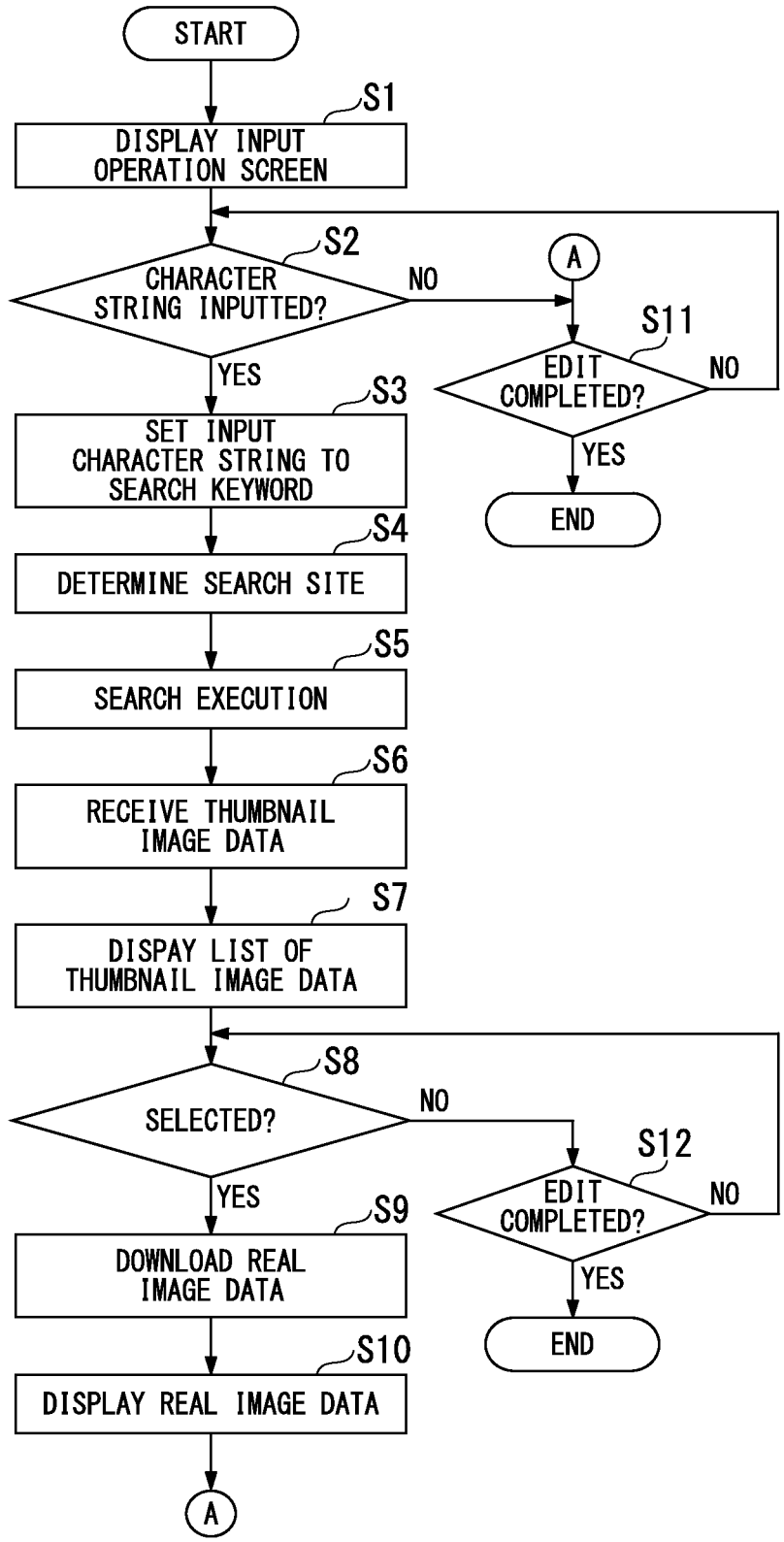
FIG. 3 A flowchart illustrating a pictogram translation process of the character translation system having a pictogram data searching function according to an embodiment of the present invention.
Figure 4:
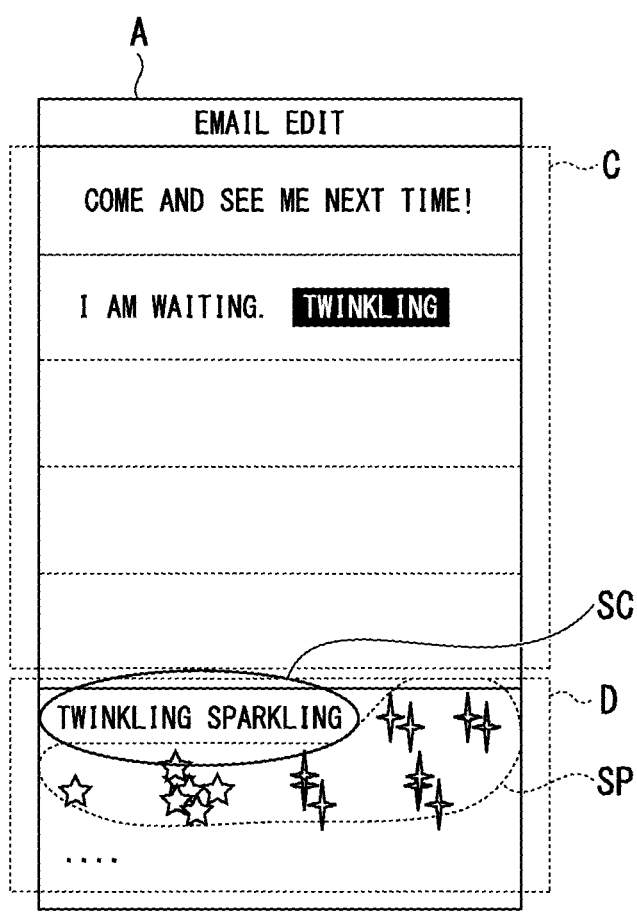
FIG. 4 An explanatory illustration for an operation screen using a conventional character translation system having a pictogram data searching function.

FIG. 3 is a flowchart illustrating a pictogram translation process of a character translation system having a pictogram data searching function according to the embodiment of the present invention.

With reference to FIGS. 1 and 2, the pictogram translation process of the character translation system having a pictogram data searching function according to the present embodiment will be described by use of FIG. 3. The following description refers to the search result for thumbnail image data.

It is preferable that the email editing part 113 performs the pictogram translation process with other necessary email editing processes by way of multitasking.

In step S1, the email editing part 113 displays an email editing screen in the character input area C of the display screen 131 via the display 13.

Next, in step S2, the search execution part 112 determines whether or not a character string is inputted. The flow proceeds to step S3 upon determination of inputting of a character string (step S2: YES), while the flow proceeds to step S11 upon indetermination of inputting of a character string (step S2: NO).

In step S3, the search execution part 112 sets an inputted character string as a search keyword.

In step S4, the search execution part 112 sets search destination sites, which falls within a search range, and the number of pictograms at higher places in searching.

In step S5, the search execution part 112 executes searching in a preset range by use of an input character string as a search keyword.

In step S6, the list display generation part 111 displays the translation candidate display area D on the display screen while obtaining the search result of thumbnail image data.

In step S7, the list display generation part 111 displays candidate images, including the search result of thumbnail image data, in the translation candidate display area D on the display screen in a list form via the display 13.

In step S8, the list display generation part 111 determines whether or not any one candidate image is selected. The flow proceeds to step S9 upon determination of selection of any one candidate image (step S8: YES), while the flow proceeds to step S12 upon indetermination of selection of any one candidate image (step S8: NO).

In step S9, when thumbnail images are selected, real image data of thumbnail images are downloaded from the search site B.

In step S10, the selected image data is displayed while substituting for a character string which is displayed in the character input area C on the display screen via the display 13. At this time, a blank stuffing process is performed as necessary. Thereafter, the flow proceeds to step S11.

In step S11, the email editing part 113 determines whether or not email editing is completed. The processing exits upon determination of completion of email editing (step S11: YES), while the flow proceeds to step S2 upon indetermination of completion of email editing (step S11: NO).

In step S12, the email editing part 113 determines whether or not email editing is completed. The processing exits upon determination of completion of email editing (step S12: YES), while the flow proceeds to step S8 upon indetermination of completion of email editing (step S12: NO); then, the processing waits for selection of any one candidate image.

The character translation system having a pictogram data searching function according to the present embodiment (i.e. an information terminal device such as the mobile terminal device 1) may demonstrate an effect allowing for users' utilization of pictograms even when no pictogram data is previously stored in the device. At this time, users do not need to execute a download operation by themselves, wherein the normal pictogram translation operation may allow users to automatically utilize pictograms in external search sites.

The mobile terminal device automatically displays plenty of pictograms, automatically searched from Web sites, as translation candidates in the translation candidate display area D of the display screen 131. This may allow users, who do not initially presume inputting of pictograms, to become aware of the presence of more suitable pictograms.

Other Embodiments

According to the embodiment of the present invention, the character translation system having a pictogram data searching function performs the pictogram searching function to search for pictogram data, specifying pictograms which can be displayed as predictive translation candidates.

As shown in FIG. 2, for example, in which when character data "I am waiting" is input into the character input area C, character data of "twinkling" can be presumed as one to be subsequently inputted, the character data "twinkling" is defined as a translation candidate and a keyword in searching, and therefore the search result of pictogram data (or their thumbnail images) will be displayed.

In this connection, it is possible to execute at least part of processing of each constituent element, included in the character translation system having a pictogram data searching function according to the present invention, by way of computer control. Programs, which may cause a computer to execute the above processing in the procedure shown in the flowchart of FIG. 3, can be stored in compute-readable storage media such as a semiconductor memory, CD-ROM, and magnetic tape. At least a computer, which may encompass a microcomputer, a personal computer, and a general-purpose computer, is allowed to read the above programs from the foregoing storage media and execute them.

In the above, the embodiment of the present invention is described in detail with reference to the drawings, whereas the detailed configuration is not necessarily limited to the embodiment; hence, it is possible to embrace design changes which may not depart from the essence of the invention.

The present application claims priority based on Japanese Patent Application No. 2010-228351, the entire content of which is incorporated herein by reference.

INDUSTRIAL APPLICABILITY

The present invention is applicable to the character translation system such as the mobile terminal device having a pictogram data searching function. The present invention makes use of pictogram data, which is not stored in the character translation system, by searching through external databases.

REFERENCE SIGNS LIST 1 mobile terminal device
11 controller
12 memory
13 display
111 list display generation part
112 search execution part
113 email editing part
114 download part
B search site
C character input area
D translation candidate display area

The invention claimed is:
1. A mobile terminal device comprising:
a controller connectible to at least one search site which is determined as a default search site in advance according to a user setting in association with an email editing operation;
a memory configured to store, in the mobile terminal device, a plurality of translation candidates corresponding to a plurality of character data, a plurality of primary translation candidates corresponding to a first set of pictogram data, the user setting representing the default search site used to search a plurality of secondary translation candidates corresponding to a second set of pictogram data and a search count indicating a maximum number of the plurality of secondary translation candidates to be downloaded according to a capacity of the memory; and
a display having a character input display area and a translation candidate display area, wherein the character input display area is able to display a character string while the translation candidate display area is able to collectively display a predetermined number of translation candidates selected from among the plurality of translation candidates, the plurality of primary translation candidates, and the plurality of secondary translation candidates,
wherein the controller is configured to carry out a character-pictogram translation by:
(i) detecting a keyword included in the character string input by a user upon activating the email editing operation,
(ii) searching at least one primary translation candidate from among the plurality of primary translation candidates stored on the memory in correspondence with the keyword,
(iii) automatically downloading at least one secondary translation candidate from the at least one search site in correspondence with the keyword in a priority order of preferentially extracting the plurality of secondary translation candidates,
(iv) displaying the predetermined number of translation candidates including the translation candidate, the primary translation candidate, and the secondary translation candidate in the translation candidate display area,
(v) allowing the user to select a specific translation candidate from among the predetermined number of translation candidates displayed in the translation candidate display area,
(vi) further downloading real image data corresponding to the secondary translation candidate when the user selects thumbnail image data serving as the secondary translation candidate, and
(vii) replacing the keyword with the specific translation candidate selected by the user in the character input display area.

2. A character-pictogram translation method implemented by a mobile terminal device connectible to at least one search site serving as a default search site according to a user setting, the mobile terminal device comprising a memory configured to store, in the mobile terminal device, a plurality of translation candidates corresponding to a plurality of character data, a plurality of primary translation candidates corresponding to a first set of pictogram data, the user setting representing the default search site used to search a plurality of secondary translation candidates corresponding to a second set of pictogram data, and a search count indicating a maximum number of the plurality of secondary translation candidates to be downloaded according to a capacity of the memory, and a display having a character input display area and a translation candidate display area, the character-pictogram translation method comprising:

detecting a keyword included in a character string input by a user with the character input display area upon activating an email editing operation, searching at least one primary translation candidate from among the plurality of primary translation candidates stored on the memory in correspondence with the keyword, automatically downloading at least one secondary translation candidate from the at least one search site in correspondence with the keyword in a priority order of preferentially extracting the plurality of secondary translation candidates, collectively displaying a predetermined number of translation candidates including the translation candidate, the primary translation candidate, and the secondary translation candidate in the translation candidate display area, allowing the user to select a specific translation candidate from among the predetermined number of translation candidates displayed in the translation candidate display area, further downloading real image data corresponding to the secondary translation candidate when the user selects thumbnail image data serving as the secondary translation candidate, and replacing the keyword with the specific translation candidate selected by the user in the character input display area.

3. The mobile terminal device according to claim 1, wherein the controller implements a predictive translation function to predict a predictive keyword, which is not included in the character string input by the user, according to the character string previously input by the user so as to carry out a further character-pictogram translation using the predictive keyword when selecting the primary translation candidate or the secondary translation candidate in order to search the pictogram data.

4. The character-pictogram translation method according to claim 2, further comprising predicting a predictive keyword, which is not included in the character string input by the user, according to the character string previously input by the user so as to use the predictive keyword when selecting the primary translation candidate or the secondary translation candidate in order to search the pictogram data.

* * * * *

UNITED STATES PATENT AND TRADEMARK OFFICE
CERTIFICATE OF CORRECTION

PATENT NO. : 10,146,771 B2
APPLICATION NO. : 13/822964
DATED : December 4, 2018
INVENTOR(S) : Shinya Okuda Page 1 of 1

It is certified that error appears in the above-identified patent and that said Letters Patent is hereby corrected as shown below:

In the Claims

Column 10, Claim 1, Line 8; after "data", insert --,--

Signed and Sealed this
Ninth Day of April, 2019

Andrei Iancu
*Director of the United States Patent and Trademark Office*